United States Patent

[11] 3,547,315

[72] Inventors Calvin L. Wilson;
John H. Fox, Jr., Chesterfield County;
Vincent J. Serio, Jr., Henrico County, Va.
[21] Appl. No. 739,561
[22] Filed June 24, 1968
[45] Patented Dec. 15, 1970
[73] Assignee Reynolds Metals Company
Richmond, Va.
a corporation of Delaware

[54] FLUID PRESSURE REGULATOR FOR A LIQUID-DISPENSING CONTAINER AND SUPPORT FOR SAID REGULATOR
24 Claims, 3 Drawing Figs.

[52] U.S. Cl.................................................... 222/61
[51] Int. Cl. ................................................. B67d 5/08
[50] Field of Search........................................... 222/396,
399, 397, 61, (Inquired); 137/505, (Inquired),
206, 209, 505.42; 73/410; 92/34, 36, 43

[56] References Cited
UNITED STATES PATENTS
2,152,781 4/1939 Wile .............................. 137/505.42
2,224,024 12/1940 Smith ........................... 73/410
3,128,019 4/1964 Mills.............................. 222/396

Primary Examiner—Stanley H. Tollberg
Attorney—Glenn, Palmer, Lyne, Gibbs & Thompson ABSTRACT: This disclosure relates to a simple fluid pressure regulator of the type particularly adapted to control the flow of a charging gas into a liquid-containing chamber of an associated dispensing container which is used to store and dispense a liquid such as a carbonated beverage, for example.

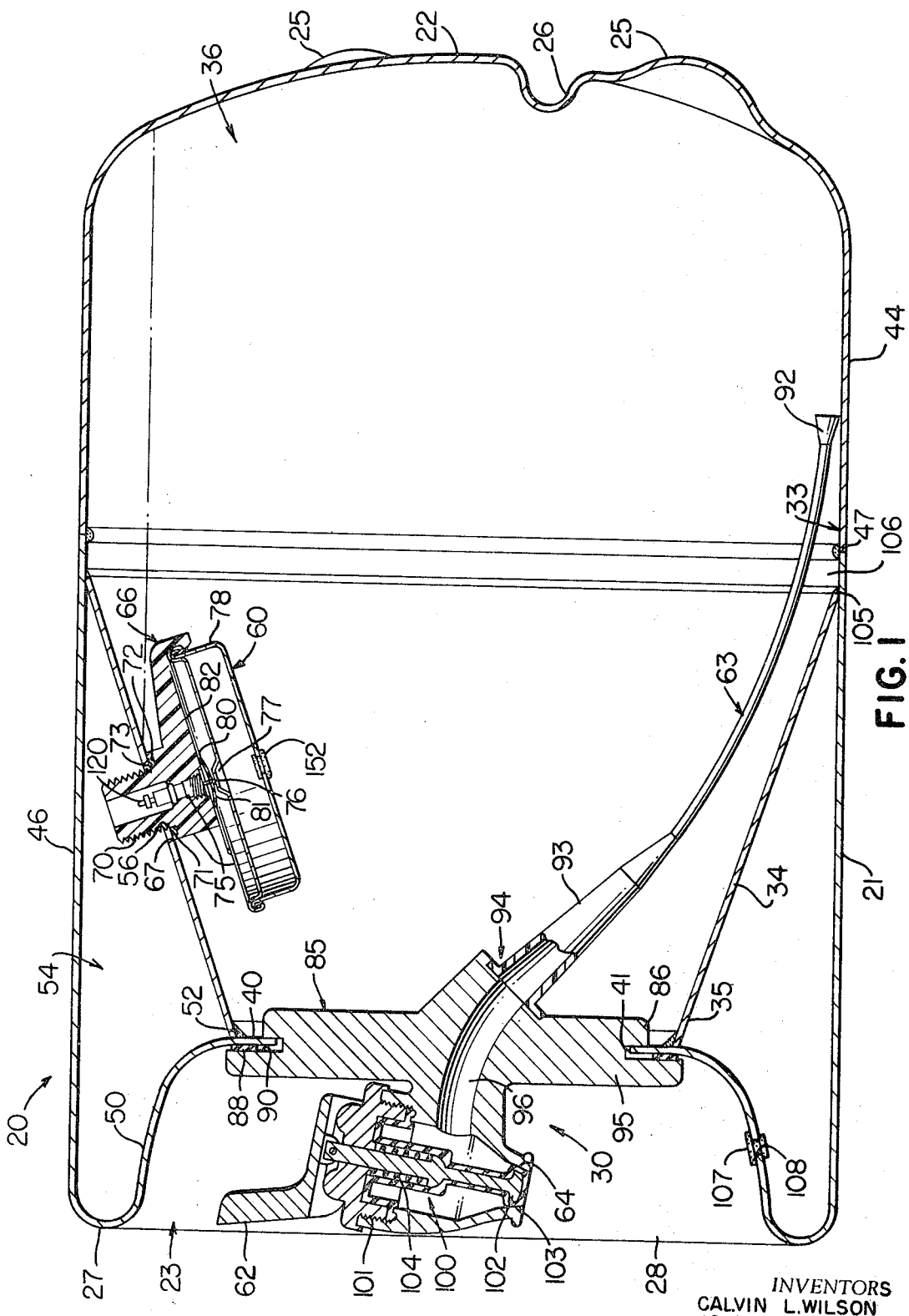

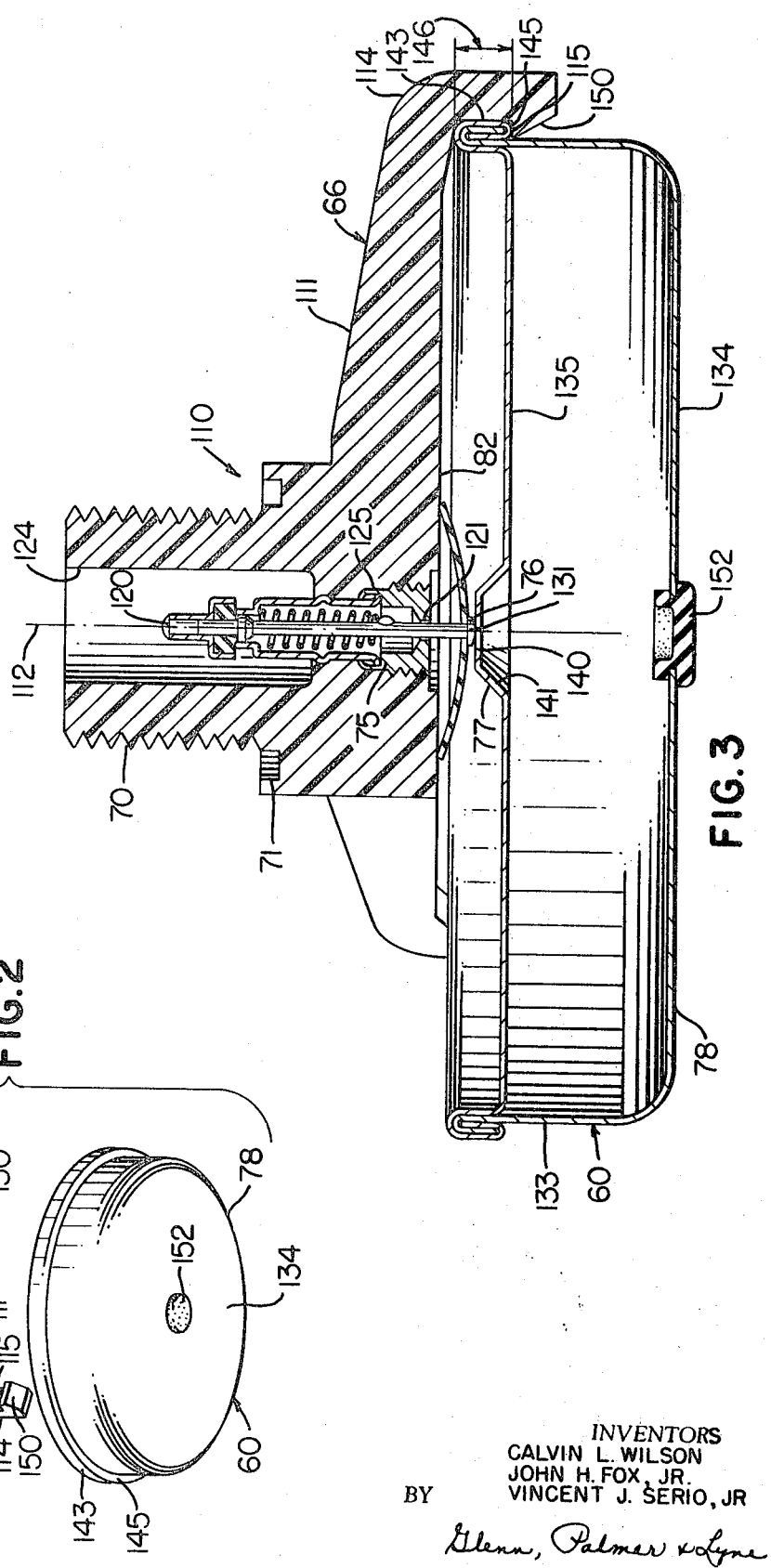

FLUID PRESSURE REGULATOR FOR A LIQUID-DISPENSING CONTAINER AND SUPPORT FOR SAID REGULATOR

BACKGROUND OF THE INVENTION

Many liquids such as carbonated beverages are sold in comparatively large dispensing containers wherein each of such containers has a beverage-containing chamber which is pressurized with a charging fluid such as carbon dioxide or nitrogen and which is introduced into such chamber in a controlled manner through the use of a pressure regulator. The pressure regulators used to introduce carbon dioxide into associated beverage-containing chambers of present dispensing containers are very complex in construction, expensive to produce, and prone to malfunction through continued use.

SUMMARY

This invention provides an improved fluid pressure regulator which is of simple and economical construction, has a unique support structure, utilizes component parts of optimum simplicity, and provides reliable operation even after extended use.

Other details, uses, and advantages of this invention will become apparent as the following description of the embodiment thereof presented in the accompanying drawings proceeds.

BRIEF DESCRIPTION OF THE DRAWINGS

The accompanying drawings show a present preferred embodiment of this invention, in which:

FIG. 1 is a cross-sectional view of a container of the type particularly adapted to store and dispense a carbonated beverage from a beverage-containing chamber thereof and through a spigot assembly comprising such container, and which uses a charging fluid which is metered in a controlled manner from another chamber provided in the dispensing container through the improved pressure regulator of this invention into the beverage-containing chamber to force the beverage through the spigot assembly upon opening thereof;

FIG. 2 illustrates an exploded perspective view of the pressure regulator of this invention showing an actuating capsule comprising such pressure regulator arranged beneath a support therefor which carries a control valve embedded within the central portion of such support substantially as an integral part thereof; and FIG. 3 is a cross-sectional view of the pressure regulator similar to the showing of FIG. 1 but presenting such pressure regulator in a greatly enlarged view.

DESCRIPTION OF ILLUSTRATED EMBODIMENT

Reference is now made to FIG. 1 of the drawings wherein a cross-sectional view of an improved container for storing and dispensing a liquid product under gaseous pressure is illustrated and designated generally by the reference numeral 20. The container 20 of this example of the invention is particularly adapted for dispensing a carbonated beverage such as beer, soft drinks, and the like and has a substantially right circular cylindrical outline designated generally by the reference numeral 21, a rear wall 22, and a recessed front wall indicated generally by the numeral 23.

The container 20 has a plurality of symmetrically arranged protrusions each designated by the reference numeral 25 provided in its rear wall 22 which may be formed as an integral part of such rear wall and are utilized to stand the container 20 in an upright manner while supporting it on the protrusions 25. The rear wall 22 also has an elongated slot 26 provided therein which is adapted to receive a positioning member therewithin to orient the container 20 on an automatic assembly line along which container 20 is moved to enable charging a propellant-containing chamber thereof with a suitable propellant used to force the carbonated beverage out of such container through a suitable spigot assembly and in a manner to be described in detail subsequently in this specification.

The front wall 23 is recessed inwardly of a front peripheral edge 27 of the cylindrical sidewall 21 so as to define a cavity 28 in the front end of the dispensing container 20. A spigot assembly designated generally by the reference numeral 30 is constructed and arranged so that it is readily installed within the cavity 28 so that it is completely protected and does not provide an unsightly protrusion outwardly of the front edge 27 of the dispensing container 20 while also enabling the dispensing container 20 to be inverted and supported on the front edge 27 of its cylindrical sidewall without interference by the spigot assembly 30, if desired.

The improved dispensing container 20 comprises an enclosing wall which is designated generally by the reference numeral 33 which has a tapered front end section 34 which terminates in a smaller end designated by the reference numeral 35. The enclosing wall 33 defines a first chamber which is particularly adapted to contain a liquid such as a carbonated beverage which is maintained under gaseous pressure by a suitable pressurizing gas. The tapered section 34 of the enclosing wall 33 terminates in an annular portion 40 which defines an open end or opening 41 for the enclosing wall 33. The spigot assembly 30 is fastened against the annular portion 40 to seal the open end 41 in a fluid-tight manner and the operation of the spigot assembly 30 and the manner of fastening such spigot assembly in position will be described in more detail subsequently in this specification.

The rear section, as viewed in FIG. 1, of the enclosing wall 33 comprising the container 20 is designated by the reference numeral 44 and comprises a forward portion of substantially right circular cylindrical outline and an integral rear portion which defines the rear wall 22 of container 20. The front section of container 20 is defined by an outer substantially tubular wall 46 which is fastened in sealed relation around the outer periphery of the enclosing wall 33 adjacent the larger end of its tapered portion 34 and in this example of the invention the outer tubular wall portion 46 is fastened to the enclosing wall 33 by a continuous circumferential weld 47.

The outer tubular wall 46 has an inner or rear portion which is of right circular cylindrical outline and an outer or forward portion provided with a substantially radially inwardly directed integral flange 50 which has a contoured configuration. The forward end of the tapered portion 34 is fastened to flange 50 in sealed relation as by welding and as shown at 52 so as to define annular portion 40 which in this example comprises an integral part of flange 50.

The tubular wall 46 with its outer end portion or flange 50 is thus fastened in position to enclosing wall 33 at 47 at its inner end and at 52 at its outer end so as to define a second propellant-containing chamber designated generally by the reference numeral 54 between the tapered wall section 34 and the outer wall section 46 and the chamber 54 is particularly adapted to contain a charging fluid such as a gas under pressure which is introduced in a controlled manner within chamber 36 to pressurize the carbonated beverage within the chamber 36 and in a manner as will be described in detail subsequently and thereby enable drawing the carbonated beverage through the spigot assembly 30.

The tapered section 34 of enclosing wall 33 may be in the form of a substantially frustoconical section and has a threaded aperture 56 provided therein for placing the liquid chamber 36 in flow communication with a source of pressurizing fluid which is carried externally of chamber 36 and in this example of the invention the pressurizing fluid is in the form of a pressurizing gas which is carried within the outer pressure chamber 54. In using container 20 for dispensing a carbonated beverage the pressurizing gas in chamber 54 is preferably carbon dioxide.

The storing an dispensing container 20 has an improved pressure regulator designated generally by the reference numeral 60 which is fastened in flow communication with the aperture 56 and the pressurizing fluid carried in chamber 54 and allows the pressurizing fluid to be introduced into the chamber 36 when the pressure level within the chamber 36 is below a predetermined level. The pressurizing gas is metered by the pressure regulator 60 into the chamber 36 in a controlled manner and upon opening a lever 62 provided on the spigot assembly 30 the pressurized liquid in chamber 36 is forced through a siphon tube 63 comprising the spigot assembly 30 and outwardly through a dispensing opening 64 provided in the spigot assembly 30 and in a known manner.

The pressure regulator 60 has a unique support designated generally by the reference numeral 66 which has an annular shoulder 67 provided thereon and a fastener for fastening the support 66 to associated supporting structure and such fastener is in the form of a threaded outer portion 70. The annular shoulder 67 is provided concentrically around the base of threaded outer portion 70 and also has an annular groove 71 which carries a suitable seal such as an O-ring seal 72.

The aperture 56 provided in the frustoconical tapered portion 34 is in the form of a threaded aperture, as previously mentioned, and the threaded portion 70 of support 66 is threaded through the threaded aperture 56 so that the O-ring seal 72 is urged and clamped against an annular portion 73 comprising the inside surface of the tapered section 34 to thereby provide a fluid-tight seal between the pressurizing chamber 54 and the chamber 36 of the dispensing container 20.

The pressure regulator 60 has a normally closed control valve 75 which is of known construction and commonly referred to as a Schrader valve provided as an integral part thereof; therefore, the valve 75 will not be described in detail. The valve 75 has a telescoping plunger or outwardly extending valve stem 76 which is normally resiliently held outwardly. The valve stem 76 is engaged by an outwardly convex projection 77 provided on an adjacent outer surface of an expandible and contractible volume capsule 78 comprising regulator 60 which is adapted to move the stem 76 and control the flow of pressurizing fluid through valve 75 and into the chamber 36.

The capsule 78 is hermetically sealed and contains a fluid under a predetermined controlled pressure and as will be apparent from FIG. 1 of the drawings the entire capsule 78 is exposed to the pressure environment of chamber 36. The operation of the pressure regulator 60 is of utmost simplicity and as the pressure in the chamber 36 decreases, due to drawing off carbonated beverage, for example, the fluid within the capsule 78 expands and moves projection 77 outwardly and against stem 76 to thereby open valve 75 and allow fluid from chamber 54 to enter the chamber 36. As the pressurizing fluid or carbon dioxide enters chamber 36 the pressure exerted against the exposed surface of capsule 78 increases thereby moving projection 77 away from stem 76 and once the correct pressure is reached within the chamber 36 the volume of capsule 78 is contracted to the desired reduced level whereby projection 77 allows the stem 76 to move to an extended position and the flow of pressurizing fluid through the valve 75 is stopped. This operation is repeated as more carbonated beverage is drawn from within the chamber 36 through the spigot assembly 30 until the entire supply of carbonated beverage within chamber 36 is used.

As the stem 76 of the control valve 75 is pushed inwardly, the carbon dioxide flows through the valve 75 and radially outwardly from an edge 80 of a cup-shaped resilient member 81 which is fixed to the terminal end of the stem 76 and serves as a one-way check valve. The member 81 may be made of a rubberlike material and is fixed adjacent the terminal outer end of the stem 76 in a fluid-tight manner and so that its edge 80 is resiliently held against an associated planar surface 82 of support 66.

The action of member 81 is such that the carbon dioxide pushes edge 80 away from the surface 82 as it flows toward chamber 36 to adjust the pressure level within chamber 36; however, any tendency for fluid within chamber 36 to flow toward the valve 75 is prevented by edge 80 being urged by such fluid tightly against the planar surface 82 and in the typical manner of a check valve.

The capsule 78 of pressure regulator 60 preferably has an inert gas, such as nitrogen, or the like, hermetically sealed therewithin. The utilization of an inert gas assures that there is a minimum tendency for the pressure regulator 60 and thus the absolute pressure within the chamber 36 to be influenced by changes in the temperature environment in which container 20 is used and hence the temperature within the chamber 36.

For example, in utilizing the container 20 for storing and dispensing a relatively highly carbonated cola drink pressurized by carbon dioxide, the pressure within chamber 36 is approximately 25 p.s.i.g. with the temperature in such chamber at 40° Fahrenheit. As the temperature within chamber 36 increases to 70° Fahrenheit the resulting pressure within chamber 36 due to the released carbon dioxide is approximately 40—50 p.s.i.g. These temperatures and pressures in the order presented above are common in using dispensing container 20 while it is kept in a normal household refrigerator and while it is exposed to a normal room ambient temperature respectively. Also, it will be appreciated that the absolute pressure within chamber 36 would be the above indicated pressures plus the normal ambient pressure for the particular altitude.

If the gas within the capsule 78 were to be of the type which expands rapidly due to increased temperature, then the tendency would be to prematurely introduce more carbon dioxide within chamber 36 and an over carbonation of the beverage within the chamber 36 would result which would be undesirable. Thus, the need for utilizing an inert gas within the capsule 78 is readily apparent to help prevent over carbonation of the beverage within the chamber 36 and thus assure such beverage is drawn from the spigot assembly 30 with minimum foaming and having optimum palatability.

The improved pressure regulator 60 is supported within the fluid chamber 36 solely by the tapered frustoconical section 34 of enclosing wall 33 and such pressure regulator is easily installed in position through the access opening 41 provided in the front end of the dispensing container 20 and over which the spigot assembly 30 is installed. The opening 41 is of comparatively large size as compared to the size of the pressure regulator 60 and enables such pressure regulator to be moved in and out of chamber 36 in an effortless manner after removal of the spigot assembly 30. It is a simple matter to install the pressure regulator 60 in position by merely inserting such regulator through the front opening 41 and threading its threaded outer portion 70 through the threaded aperture 56 provided in the tapered frustoconical wall 34. The installation of pressure regulator 60 may be achieved strictly manually and/or using a suitable fastening device to firmly tighten the regulator 60 in position and assure that the O-ring seal 72 is urged tightly against annular surface 73 adjoining the threaded aperture 56 to provide a fluid-tight connection between the chamber 54 and the beverage-containing chamber 36.

Not only is the large access opening 41 provided in the front end of the container 20 usable to enable installation and removal of the pressure regulator 60, such opening 41 is sufficiently large that it enables the inside surface of the enclosing wall 33 which defines the liquid chamber 36 to be easily cleaned with a suitable cleaning fluid and properly flushed. The opening 41 is used to clean and flush the inside surface of enclosing wall 33 upon initially filling chamber 36 of a new container 20 with a carbonated beverage as well as to clean and flush such inside surface once the original beverage is dispensed from container 20 and the container is to be reused.

The spigot assembly 30 may be fastened in position using a bayonet-type connector which is of known construction and designated generally by the reference numeral 85. A yieldingly compressible O-ring seal 88 is utilized between the outside surface of the annular portion 40 comprising flange 50 and compressed thereagainst by an annular surface 90 of spigot assembly 30 to provide a fluid-tight seal between the spigot assembly 30 and the fluid chamber 36. The seal 88 may be a separate seal or such seal may be provided as an integral part of surface 90 or as an integral part of the outside surface of annular portion 40.

The spigot assembly 30 has a siphon tube 63 which, in this example, has an inlet section 92 of converging flow area and an outlet section 93 of diverging flow area which is fastened to the main portion of the spigot assembly 30 by any suitable means and as shown at 94. The spigot assembly 30 may be comprised of a one-piece housing 95 which has the bayonet connector 85 provided at its inner end portion as an integral part thereof and the housing 95 has an integral liquid dispensing passage 96 extending therethrough and terminating in the previously mentioned dispensing opening 64.

A normally closed spigot valve assembly 100 has male threads provided thereon which are threaded in cooperating female threads provided on the one-piece housing 95 as shown at 101 to detachably fasten valve assembly 100 to housing 95. The valve assembly or valve 100 has a tapered plug 102 corresponding in peripheral outer outline to the outline of an inside surface 103 defining opening 64 so that upon pulling the lever 62 forwardly to an open position the carbonated beverage contained within the chamber 36 is forced by the carbon dioxide gas through the siphon tube 63 and through the dispensing opening 64 in a known manner. Once the lever 62 is released a compression spring 104 within the valve assembly 100 urges the tapered plug 102 against the cooperating surface 103 to provide a substantially dripless spigot for the dispensing container 20.

The dispensing container 20 is of utmost simplicity and utilizes a minimum number of component parts. In particular, it will be seen that the housing or fluid-containing sections of the container 20 comprise three main sections which in this example are suitably welded and used together with the improved pressure regulator assembly of this invention, a spigot assembly, and a charging plug to be subsequently described. These three housing sections have been previously described in some detail as to arrangement and function; however, the present description is made to highlight the manner in which such sections are welded to enable producing container 20 at minimum cost.

The forward section 46 is of substantially right circular cylindrical configuration at its inner end portion and has inwardly directed flange 50 of arcuated configuration defining its front end portion. The front edge 27 of container 20 is defined at the line of junction between flange portion 50 and the remainder of the section 46. The frustoconical wall section 34 of this exemplary container 20 is provided as a separate section which has its large diameter portion welded adjacent the inner end of section 46 and 105 so that a small height cylindrical strip portion 106 comprises the inner end portion of section 46. The front or small diameter end of frustoconical section 34 is welded against the inwardly directed flange 50 of cylindrical section 46 by the weld 52 to define the annular portion 40 which comprises the forward portion of the enclosing wall 33. The inner edge of section 46 is welded to the corresponding exposed edge of section 44 by annular weld 47.

The enclosing wall 33 is thus comprised of the cylindrical section 44 with its rear wall 22, portion 106 of cylindrical section 46, frustoconical section 34, and a portion of inwardly directed flange 50 of cylindrical wall 46 which defines annular portion 40.

As previously indicated, the container 20 has a charging or pressurizing fluid provided in its chamber 54 and for a carbonated beverage such charging fluid is preferably in the form of a pressurizing gas such as carbon dioxide. The carbon dioxide gas is introduced in the chamber 54 using a suitable charging needle which is inserted through a charging plug 107 provided in the flange portion 50 of wall 46. The plug 107 may be of any suitable known construction and made of a rubberlike resilient material which may have a previously formed slit provided therein to facilitate easy entry of an associated charging needle. However, the plug 107 may be a solid plug through which the charging needle makes its own opening once the chamber 54 is charged with carbon dioxide. It will be appreciated that in either event whether the opening is normally provided in charging plug 107 or formed upon insertion of a charging needle therethrough the pressure within the chamber 54 upon removal of the charging needle is sufficient to seal such opening once the charging needle is removed and in a manner which is known in the art. The charging plug 107 extends through an opening 108 provided in the flange portion 50 and is suitably held in position by a pair of integral flange portions thereof which extend against the inside and outside surfaces respectively of flange 50 which adjoin the opening 108.

Reference is now made to FIGS. 2 and 3 of the drawings for a more detailed presentation of the improved pressure regulator 60 of this invention. The pressure regulator 60 has its support 66 preferably made of a resilient nonmetallic plasticlike material such as nylon, for example, and is formed as one integral unit. Support 66 has a supporting hub 110 and a plurality of radial arms each designated by the same reference numeral 111 extending from the lower portion (as viewed in the drawings) of the hub 110 and in a symmetrical manner about a central axis 112 of hub 110 and hence support 66.

Although any desired number of arms 111 may be formed in the support 66 so as to define a supporting yoke or spider arrangement, in this example of the invention a plurality of three arms 111 are utilized and such arms are spaced 120° apart. Each arm 111 extends substantially perpendicular to the central axis 112 of the support 66 and each arm has a holding member which is adapted to engage and hold the upper end portion of the actuating capsule 78 in position against the support 66 and in a manner to be described in more detail subsequently in this specification. In particular, it will be seen that the holding member provided on each arm 111 is in the form of an inwardly hooking terminal end 114 which is provided with a supporting ledge 115 which engages a portion of the actuating capsule 78. The ledges 115 provided on arms 111 cooperate to support the capsule 78 against support 66 and so that its convex projection 77 is precisely positioned with respect to the actuating plunger 76 of control valve 75.

As will be apparent from FIG. 3 of the drawings, the threaded fastener or outer portion 70 of support 66 is provided at the upper portion of hub 110 and the arms 111 extend outwardly from the lower portion of such hub. Also, as seen in FIG. 1, the control valve 75 is provided as an integral part of support 66 and has an inlet 120 which is in flow communication with the pressurizing fluid in pressure chamber 54 and an outlet 121 which extends beneath the lower portion of the support 66 and is in flow communication with the chamber 36 of the container 20.

The valve 75 may be fixed to support 66 in any suitable manner so as to provide a fluid-tight seal therebetween; however, support 66 is preferably made of an easily moldable plasticlike material which is molded around the control valve 75 so that it is fixed thereto to form a unitary construction while allowing fluid flow through the valve 75 in an unobstructed manner.

In forming the support 66 by molding such support 66 around the control valve 75 it will be appreciated that a central opening is provided through the hub portion 110 of support 66 and such central opening has an upper part 124 which receives an associated upper end portion of the control valve 75 and such upper part provides a passage for the pressurizing fluid through the upper end portion of the support 66 to the inlet 120 of the control valve 75. The central opening provided in the hub 110 also has a lower part 125 which is determined by the adjoining configuration of a control valve 75.

Although, reference is made above to lower part 125 of the central opening through hub 111 it will be appreciated that in this example of the invention the opening 125 is not formed in advance in hub 110 but would be present if the control valve 75 could be forced from its embedded position. However, it will be appreciated that the lower end portion of the support 66 and in particular the lower portion of hub 110 may have an opening corresponding in configuration to the opening illustrated at 125 while being slightly larger in size than the corresponding portions of valve 75 to be embedded in position, whereby the valve 75 could then be suitably held in the larger opening and embedded through the use of a suitable liquid plastic which is adapted to solidify and upon solidification provides an integral construction similar to the construction illustrated in FIG. 3 of the drawings.

In any event, it will be appreciated that the valve 75 is integrally bonded as a unitary construction within the support 66 and so that the stem or telescoping plunger 76 extends outwardly of the control valve 75 and below or outwardly of the planar surface 82 and so that its outer extremity shown at 131 is in a predetermined position with respect to the support 66 and upon fastening the actuating capsule 78 in position the valve 75 will operate in the desired manner and as previously described. In particular, the terminal end 131 of the valve stem 76 is adapted to be engaged by the convex projection 77 of actuating capsule 78 to thereby actuate the stem 76 in response to the pressure environment surrounding the actuating capsule 78.

The actuating capsule 78 of the improved pressure regulator 60 of this invention has its walls made of only two component parts defined by a right circular cylindrical side wall 133 having an integral bottom wall 134 and a top wall 135 fastened to the open end of the cylindrical side wall 133. The top wall 135 may be fastened in position to the outer open end of the cylindrical side wall 133 in any suitable manner as by mechanical swaging, or the like.

To assure that there is minimum flexing at the area of contact between the plunger or stem 76 of the control valve 75 and the associated outer surface of the actuating capsule 78, the outwardly convex projection 77 previously mentioned is provided in top wall portion 135. The convex projection 77 is comprised of an outer planar surface 140 which is of circular peripheral outline and is adjoined around the periphery thereof by an outwardly flaring or diverging frustoconical surface portion 141 the loser portion of which blends smoothly with the remaining portion of top wall 135. As the fluid contained within the actuating capsule 78 expands and contracts the outwardly convex portion 77 also moves in a corresponding manner and the flat portion 140 thereof is urged against the plunger 76 with substantially no deflection or flexing at the area of contact and thus the actuation of plunger 76 and hence the flow of carbon dioxide into chamber 36 is more accurately responsive to the movement of the top wall 135 as determined by the pressure within the beverage-containing chamber 36.

The top wall 135 is fastened in position against the open end of the right circular cylindrical wall 133 of the actuating capsule 78 so that a chime designated by the reference numeral 143 is formed at the upper end portion of the actuating capsule 78. The chime 143 has a lower edge 145 which is adapted to be supported on the supporting ledges 115 of the radial arms 111 provided on the support 66. The height of the chime 143 and the general construction thereof is closely coordinated with the height shown at 146 on each hooking terminal end 114 of an associated arm 111 and the various other surfaces, such as surfaces 82 and 115, of support 66 are also controlled with respect to the position in which the control valve 75 is molded so as to assure that the convex projection 77 is positioned at the desired location relative to the stem 76 of control valve 75 to further assure that the pressure regulator 60 responds accurately to the pressure which surrounds its actuating capsule 78.

The actuating capsule 78 is in the form of a substantially right circular cylindrical can which may be made of any suitable material such as metal containing aluminum, for example. Further, the chime 143 is preferably formed at the top of capsule 78 so that it has optimum hoop strength to enable the capsule 78 to be easily snap fitted in position merely by urging chime 143 against the outer end portions of arms 111.

As previously indicated the support 66 is preferably made of a resilient plasticlike material such as nylon, or the like, which also provides optimum corrosion resistance. In using such a resilient material, it will be appreciated that the arms 111 may be slightly deflected adjacent their inwardly hooking terminal ends 114 so that the chime 143 may be placed inwardly of supporting ledges 115 and upon releasing the deflecting forces against arms 111 such arms are snap fitted around the chime 143 of actuating capsule 78.

The inwardly hooking terminal end 114 of each radial arm 111 has an inclined cam surface 150 formed thereon and each cam surface 150 terminates at a location defining one edge of supporting ledge 115. The cam surfaces 150 provide a camming action upon urging the chime 143 of a capsule 78 thereagainst which slightly deflects the resilient arms 111 away from such capsule momentarily and enables such arms to be snap fitted around chime 143.

The actuating capsule 78 of pressure regulator 60 has a calibration plug 152 of known construction fixed in one of its outer walls and in this example of the invention the calibration plug 152 is fixed in the center portion of its bottom wall portion 134. The calibration plug 152 may be fixed in position in any suitable fluid-tight manner and is used in a manner which is well known in the art to introduce a suitable fluid, which is accurately controlled within a precise temperature and pressure range, within capsule 78 and for a purpose previously described in detail.

While a present exemplary embodiment of this invention has been illustrated and described, it will be recognized that this invention may be otherwise variously embodied and practiced within the scope of the following claims.

We claim:

1. In combination: a dispensing container having a liquid chamber pressurized with a pressurizing fluid from a source thereof and a pressure regulator responsive to the pressure within said chamber to control the flow of pressurizing fluid from said source into said chamber, said pressure regulator comprising, a support, a control valve carried by said support and having an inlet in flow communication with said source of pressurizing fluid and an outlet in flow communication with said chamber, and a self-contained actuating capsule for actuating said control valve, said actuating capsule being in the form of a completely enclosed substantially cylindrical can and being supported solely from one end portion thereof by said support, said capsule comprising a single thickness outer wall having an outer surface which is moved as a function of the fluid pressure within said chamber and which operatively associates with said control valve to allow fluid flow therethrough and into said chamber.

2. A combination as set forth in claim 1 in which said control valve is fixed in the central portion of said support in a fluid-tight manner to form a unitary construction while allowing flow through said control valve in an unobstructed manner.

3. A combination as set forth in claim 2 in which said control valve is fixed in the central portion of said support by molding said support around said control valve.

4. In combination: a dispensing container having a liquid chamber pressurized with a pressurizing fluid from a source thereof and a pressure regulator responsive to the pressure within said chamber to control the flow of pressurizing fluid from said source into said chamber, said pressure regulator comprising, a support, a control valve carried by said support and having an inlet in flow communication with said source of pressurizing fluid and an outlet in flow communication with said chamber, and an actuating capsule for actuating said control valve with said actuating capsule being supported solely from one end portion thereof by said support, said capsule having an outer surface which is moved as a function of the fluid pressure within said chamber and which operatively associates with said control valve to allow fluid flow therethrough and into said chamber, said actuating capsule comprising a substantially right circular cylindrical capsule which contains a fluid at a predetermined pressure and has a chime comprising said one end portion, and said support includes an arm which is adapted to engage said chime and hold said actuating capsule in position on said pressure regulator.

5. A combination as set forth in claim 1 in which said outer surface of said capsule has an outwardly convex projection provided as an integral part thereof which operatively associates with said control valve by engaging a telescoping plunger thereof to move said plunger and allow said fluid flow into said chamber.

6. A combination as set forth in claim 5 in which said convex projection is defined by an outer planar surface of circular outline which is adjoined around the periphery thereof by a frustoconical surface which flares outwardly toward the main portion of said outer surface and blends smoothly therewith, said convex projection assuring accurate actuation of said plunger with no flexing at the area of contact between said plunger and convex projection and thus assuring more accurate control of the pressure level in said chamber.

7. A combination as set forth in claim 1 in which said cylindrical can defining said actuating capsule has its walls made of two component parts defined by a right circular cylindrical side wall having an integral bottom wall and a top wall defining said outer wall and being fixed to the open end of said cylindrical side wall by mechanically swaging the adjoining peripheral edges to provide a fluid-tight seal.

8. In combination: a dispensing container having a liquid chamber pressurized with a pressurizing fluid from a source thereof and a pressure regulator responsive to the pressure within said chamber to control the flow of pressurizing fluid from said source into said chamber; said pressure regulator comprising: a support; a control valve carried by said support and having an inlet in flow communication with said source of pressurizing fluid and an outlet in flow communication with said chamber; and an actuating capsule for actuating said control valve with said actuating capsule being supported solely from one end portion thereof by said support; said support including, a supporting hub having a central axis, a plurality of radial arms extending from said hub substantially perpendicular to said central axis, and a plurality of holding members corresponding in number to said plurality of arms and each being provided on an associated arm adjacent its outer end, said holding members engaging and holding said actuating capsule in position; said capsule having an outer surface which is moved as a function of the fluid pressure within said chamber and which operatively associates with said control valve to allow fluid flow therethrough and into said chamber.

9. In combination: a dispensing container having a liquid chamber pressurized with a pressurizing fluid from a source thereof and a pressure regulator responsive to the pressure within said chamber to control the flow of pressurizing fluid from said source into said chamber; said pressure regulator comprising: a support; a control valve carried by said support and having an inlet in flow communication with said source of pressurizing fluid and an outlet in flow communication with said chamber; and an actuating capsule for actuating said control valve with said actuating capsule being supported solely from one end portion thereof by said support; said support being made of a nonmetallic material which is molded around said control valve to form a unitary construction while allowing fluid flow through said control valve in an unobstructed manner and said support comprising a supporting hub having a central axis, a plurality of radial arms extending from said hub substantially perpendicular to said central axis, and a plurality of holding members corresponding in number to said plurality of arms and each being provided on an associated arm adjacent its outer end, said holding members engaging and holding said actuating capsule in position; said capsule having an outer surface which is moved as a function of the fluid pressure within said chamber and which operatively associates with said control valve to allow fluid flow therethrough and into said chamber.

10. A combination as set forth in claim 9 in which said outer surface of said capsule has an outwardly convex projection provided thereon and said control valve has a telescoping plunger extending outwardly therefrom which engages said outwardly convex projection and is adapted to be moved thereby as a function of the pressure in said chamber to allow flow of pressurizing fluid into said chamber.

11. A combination as set forth in claim 10 and further comprising a sealing member fixed to the outer end portion of said telescoping plunger in a sealed manner and serving as a one-way check valve between said chamber and said control valve so that pressurizing fluid flows through said control valve and radially outwardly from the outer peripheral edges of said seal into said chamber yet fluid flow from said chamber toward said control valve is prevented by said sealing member being urged tightly against a cooperating planar surface on said support.

12. A combination as set forth in claim 9 in which said actuating capsule comprises a substantially right circular cylindrical capsule which contains a fluid at a predetermined pressure and has a chime comprising said one end portion.

13. A combination as set forth in claim 12 in which said plurality of radial arms comprise a plurality of resilient radial arms of equal length and having inwardly hooking terminal ends provided with supporting ledges, and each arm having an associated one of said supporting ledges provided thereon and defining one of said holding members, said ledges supporting the lower edge of said chime and the resilient nature of said arms enabling them to be snap fitted around said chime.

14. A combination as set forth in claim 13 in which each of said inwardly hooking terminal ends has an inclined cam surface which enables easy flexing of said resilient arms to provide said snap fitting.

15. A support for a fluid pressure regulator comprising, a central supporting hub having a central axis, a plurality of radial arms extending from said hub substantially perpendicular to said central axis and being arranged in angularly spaced relation, and a plurality of holding members corresponding in number to said plurality of arms and each being provided on an associated arm adjacent its outer end, said holding members being adapted to engage and hold an actuating capsule comprising said pressure regulator in position against said arms.

16. A support as set forth in claim 15 made as an integral unit of a resilient substantially rigid, nonmetallic material which provides optimum corrosion resistance.

17. A support as set forth in claim 15 in which said arms are resilient in character to enable easy snap fitting of said holding members against said actuating capsule.

18. A support as set forth in claim 15 which is formed as an integral unit and with its hub being adapted to be formed in sealed relation around a control valve comprising said pressure regulator.

19. A support for a fluid pressure regulator comprising: a supporting hub having a central axis; a plurality of radial arms extending from said hub substantially perpendicular to said central axis; and a plurality of holding members corresponding in number to said plurality of arms and each being provided on an associated arm adjacent its outer end, said holding members being adapted to engage and hold an actuating capsule comprising said pressure regulator in position against said arms, said hub having a lower portion from which said plurality of radial arms extend in a symmetrical manner and an upper portion provided with a fastener for fastening said support and associated components to a supporting structure.

20. A support for a fluid pressure regulator comprising: a supporting hub having a central axis; a plurality of radial arms extending from said hub substantially perpendicular to said central axis, and a plurality of holding members corresponding in number to said plurality of arms and each being provided on an associated arm adjacent its outer end, said holding members being adapted to engage and hold an actuating capsule comprising said pressure regulator in position against said arms, said hub having a central opening extending therethrough and the lower part of said central opening being adapted to receive therewithin a control valve which comprises said pressure regulator and said hub also having a lower portion from which said plurality of radial arms extend in a symmetrical manner and a threaded upper portion for fastening said support and its associated components to a supporting structure.

21. A support as set forth in claim 20 in which said hub has a shoulder provided at the base of said threaded upper portion, said shoulder having an annular groove provided therein which is adapted to receive a seal which is to be clamped between said shoulder and an adjoining supporting structure.

22. A support as set forth in claim 21 in which, said plurality of radial arms comprise a plurality of resilient radial arms of equal length, said arms having inwardly hooking terminal ends provided with supporting ledges, each arm having an associated one of said supporting ledges provided thereon and defining one of said holding members, said ledges being adapted to support a chime provided at one end of said actuating capsule, and said resilient arms being adapted to be snap fitted in position around said chime with the lower edge of said chime being supported on said supporting ledges.

23. A support as set forth in claim 22 in which each of said inwardly hooking terminal ends has an inclined cam surface which is adapted to engage and cam a portion of said chime in position against said support.

24. In combination: a dispensing container having a liquid chamber pressurized with a pressurizing fluid from a source thereof and a pressure regulator responsive to the pressure within said chamber to control the flow of pressurizing fluid from said source into said chamber, said pressure regulator comprising a support, a control valve carried by said support and having an inlet in flow communication with said source of pressurizing fluid and an outlet in flow communication with said chamber, and an actuating capsule for actuating said control valve with said actuating capsule being supported solely from one end portion thereof by said support, said support including a supporting hub having a central axis and a radial arm fastened to said hub and extending substantially perpendicular to said central axis, said radial arm having a holding member adjacent its outer end which engages and helps in holding said actuating capsule in position on said pressure regulator, said capsule having an outer surface which is moved as a function of the fluid pressure within said chamber and which operatively associates with said control valve to allow fluid flow therethrough and into said chamber.